J. VALE.

Baker's Oven.

No. 4,056. Reissued June 28, 1870.

Witnesses:

Kingsbury Root

Rufus Ketcy

Inventor:

Joseph Vale

N. PETERS, PHOTO-LITHOGRAPHER, WASHINGTON, D. C.

United States Patent Office.

JOSEPH VALE, OF BELOIT, WISCONSIN.

*Letters Patent No.* 79,615, *dated July* 7, 1868; *reissue No.* 3,769, *dated January* 11, 1870; *reissue No.* 4,056, *dated June* 28, 1870.

DIVISION B.

OVEN.

The Schedule referred to in these Letters Patent and making part of the same.

I, JOSEPH VALE, of Beloit, in the county of Rock and State of Wisconsin, have invented certain Improvements in Rotary Bake-Ovens, of which the following is a specification.

The nature of my invention consists in the combination of a rotary baking-hearth and a furnace, from which the heat and gases of the fire pass directly into the baking space in which the rotary hearth revolves. A direct heat in contradistinction from radiated heat passes from the fire to the baking-chamber of the oven, and, by having a horizontal rotary hearth, the bread is constantly kept near the fire while being baked.

I am aware that rotary hearths have been used in ovens with radiated heat, and I am also aware that direct heat has been used in what is called reel-ovens, and I do not claim either construction.

But a horizontal rotary hearth, revolving immediately over the fire, the heat passing directly to the hearth without being radiated, is an extremely simple construction, and bakes evenly and well with a small amount of fuel.

*Description of the Accompanying Drawing.*

*General Description.*

A represents the walls and body of the oven.

H, the revolving hearth and pivoted shaft, to which it is supported by suitable arms.

The revolving hearth is constructed of suitable material, supported by metallic arms. And the said revolving shaft has a suitable step-box, in which the lower end of said pivot may freely revolve.

Figure 3:
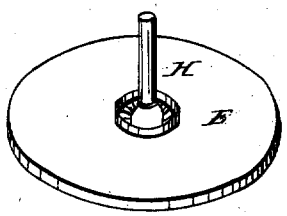
Figure 3 is a perspective view of the rotating hearth H and shaft H′, detached.

The said revolving hearth is rotated by inserting the pointed end of a spike or poker in the perforations in the turned down edge or outer rim of the said revolving hearth H, of fig. 3, moving the same with convenient ease, or it may be turned by suitable gearing attached to the upright shaft H′, or by a lever and ratchet attached thereto.

Figure 2:
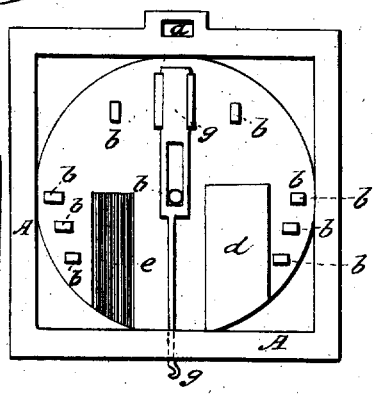
Figure 2 is a horizontal sectional view taken in a line through the oven at the top of the fixed hearth.
Figure 1:
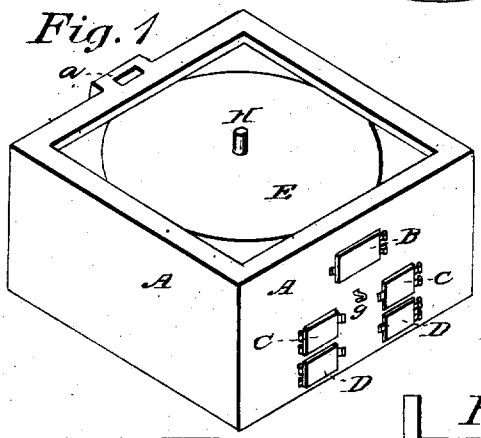
Figure 1 is a perspective view of the exterior of the oven.
Figure 4:
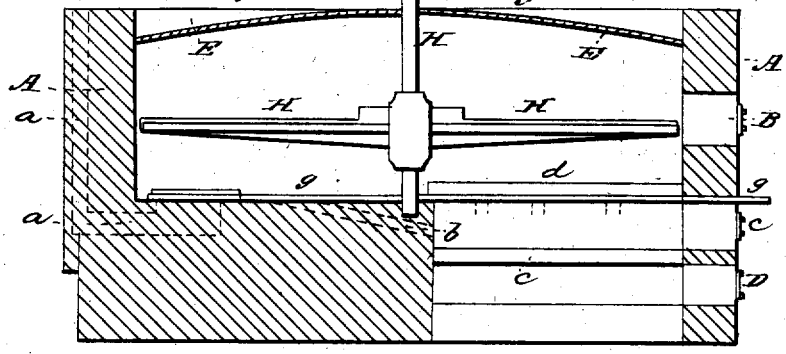
Figure 4 is a vertical section, nearly through the center, from front to rear of the oven.

C C are fire-grates, and the doors opening into the same, as shown in figs. 1, 2, and 4.

C, fig. 2, shows one of the fire-grates having the iron cover removed for the purpose of exhibiting its position.

D D are doors, for regulating the draught of the furnaces and withdrawing the ashes from under the grates.

*d d* are heavy iron covers for the fire-flues or furnaces, in the drawing, one of which is removed to show the fire-grate C, fig. 2.

*a a* is the smoke-flue or chimney.

*b b* are flues for admitting the heat, smoke, and gases from the fire into the baking-chamber, directly under and around the rotary hearth.

*g* is a sliding damper, by the employment of which smoke and gases are allowed to escape through the flue or chimney *a a*, and is operated by the hook at *g*, fig. 2.

The crown E is made of brick, in the ordinary manner, or it may be made of heavy sheet metal, as represented in the drawing, suitably supported by ribs or arms.

The upper end of the rotating shaft H′ is pivoted through the center of said crown E, and, if made of metal, said oval disk or crown is covered six or twelve inches deep with sand, when in use, to prevent the escape of heat from the oven.

The furnace being directly under the fixed hearth, the heat is admitted to the oven directly, circulating under the rotating hearth, ascending by the spaces between the rim of said hearth and the wall of the oven, also up through the opening round the shaft H′, pervading every part of the oven at the same time.

The oven is operated, in baking, through the door B, fig. 1. Batches of bread, &c., are placed upon the hearth H, successively, until one revolution has been made, when it will be found that those first placed thereon are sufficiently done to be removed.

It will be observed that the hearth H may be hung and revolved in various ways, and still be near the direct heat of the fire, and also the construction of the furnace may be varied and still throw its heat as directly to the rotary hearth, and, as I do not place any special claim in this patent, either upon the hearth or furnace shown, I may substitute any known rotary hearth, and any furnace which admits its heat direct to the baking-chamber; but What I do claim, and desire to secure by Letters Patent, is—

*Claim.*

The combination, in a bake-oven, of a horizontal rotary hearth and a furnace, when constructed and arranged so as to operate substantially as set forth.

JOSEPH VALE.

Witnesses:
L. L. COBURN,
HEINRICH F. BRUNS.